United States Patent [19]

Jourdain et al.

[11] Patent Number: 4,828,537
[45] Date of Patent: May 9, 1989

[54] MULTI-SPEED FREE-WHEEL RING FOR BICYCLES

[75] Inventors: Marc Jourdain, Eu; Michel Marnat, Dargnies, both of France

[73] Assignee: Establissements Maurice Maillard, Icheville, France

[21] Appl. No.: 81,387

[22] Filed: Aug. 4, 1987

[30] Foreign Application Priority Data

Aug. 5, 1986 [FR] France .............................. 86 11324

[51] Int. Cl.⁴ ............................................. F16H 55/30
[52] U.S. Cl. .................................. 474/160; 29/159 R
[58] Field of Search ............... 474/158, 160, 164, 165, 474/902, 78, 77; 29/159 R, 159 A, 159.2, 159.3

[56] References Cited

U.S. PATENT DOCUMENTS

| 3,661,021 | 5/1972 | Ohshita | 474/160 X |
| 4,154,123 | 5/1979 | Nagano | 474/160 X |
| 4,518,374 | 5/1985 | Kanemitsu | 29/159 R X |
| 4,528,734 | 7/1985 | Beyer | 29/159 R X |

Primary Examiner—Thuy M. Bui
Attorney, Agent, or Firm—Sughrue, Mion, Zinn, Macpeak and Seas

[57] ABSTRACT

A multi-speed free-wheel sprocket support ring having two ball races for connecting the ring to an interior starwheel, and ratchet teeth intended to interact with spring clicks supported by the starwheel, said support ring is formed by at least one thin-walled tubular member (2,3). The ball races (7,10) and the toothing (9) are formed by deformations of the wall of the member.

11 Claims, 3 Drawing Sheets

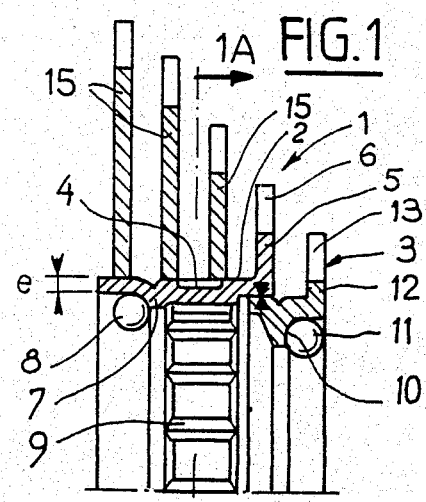
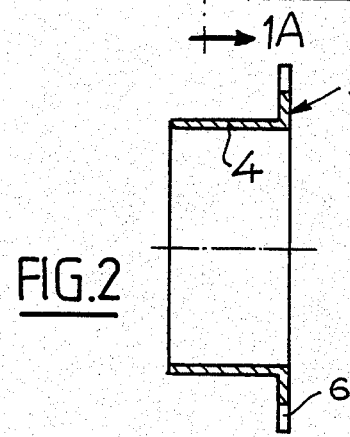
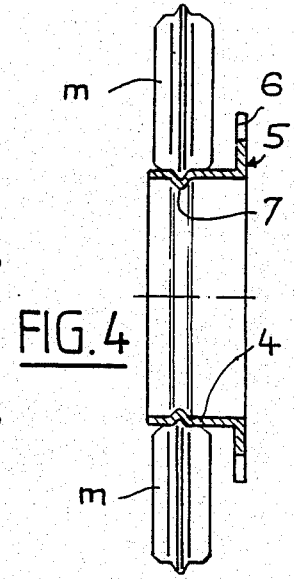
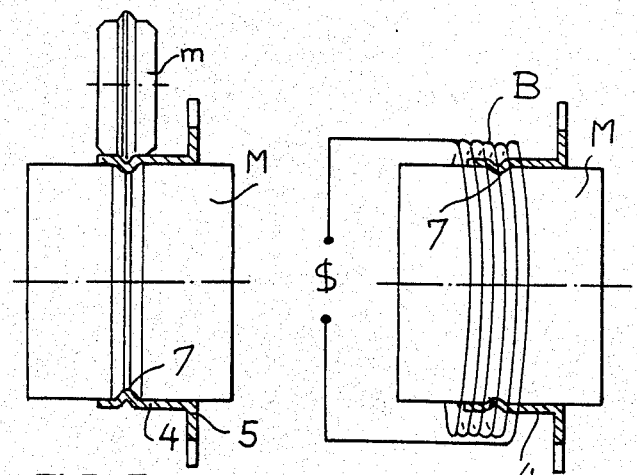
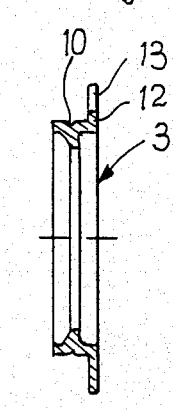

MULTI-SPEED FREE-WHEEL RING FOR BICYCLES

BACKGROUND OF THE INVENTION

The present invention relates to bicycle free wheels and relates more specifically to the production of exterior sprocket support rings for such free wheels.

Exterior sprocket support rings for multi-speed bicycle free wheels are components which support the various sprockets on which the transmission chain will resolve as required by the cyclist when the latter wishes to adapt his effort and his speed to the contour of the road which he is travelling.

In a first known form, these rings are thick tubular components obtained by machining forged or stamped blanks, or by simple machining. They receive sprockets to which they are fixed by means such as threading and/or keying. In the interior part of these rings are provided two ball races for rows of balls, obtained by stamping, machining and/or rolling, and ratchets, obtained by forging, slotting or broaching.

According to a second known form, these rings can themselves be toothed on the exterior and hence require the presence of a reduced number of sprockets for the same number of gears.

Finally, in a third known form, described in published FR Patent Application No. 2,584,639, belonging to the Applicant, there is no longer a sprocket support ring in the strict sence, but a welded assembly of different sprockets, each of whose bores possesses a toothing, and whose extreme sprockets possess rolling surfaces, which makes it possible to create the two ball races for the rows of balls and the ratchets.

The sprocket support rings produced according to the first two known forms require the utilization of powerful equipment, consuming large quantities of energy, entailing substantial wastage of material during the machining stages and hence resulting in the production of articles whose retail price is relatively high.

The group of sprockets assembled in accordance with the abovementioned patent application, and replacing the ring, results in the utilization of less powerful equipment and in reduced wastage of material, but makes it necessary to have available numerous sprocket models (and tooling to create them) since the sprockets vary both in respect of their number of teeth and in respect of their profile, which varies in accordance with the position they occupy.

SUMMARY OF THE INVENTION

The object of the invention is to enable rings to be produced by means of equipment which consumes little energy, resulting in little wastage of material by virtually eliminating the machining operations, without however requiring a large number of sprocket models.

It thus relates to a multi-speed free-wheel sprocket support ring possessing two ball races for rows of balls for connecting the ring to an interior starwheel, and ratchet teeth intended to interact with spring clicks supported by the starwheel, characterized in that it is formed by at least one thin-walled tubular member and in that the ball races and the ratchet teeth are formed by deformations of the wall of the member.

BRIEF DESCRIPTION OF THE DRAWINGS

The invention will be better understood with the aid of the description which follows and is given solely by way of example and with reference to the attached drawings, in which:

FIG. 1 is an elevational half-view, in section, of a free-wheel ring in two parts according to a first embodiment of the invention;

FIG. 1A is a diagrammatic view in section along the line 1A—1A in FIG. 1 showing the profile of a portion of the ring according to FIG. 1 on which the ratchet toothing is produced;

FIG. 2 is an elevational view in section of a blank from which a first part of the ring according to FIG. 1 is produced;

FIG. 3 is a view analogous to that according to FIG. 2, showing a first method of producing a peripheral indentation in the blank according to FIG. 1;

FIG. 4 is a view analogous to that according to FIG. 3 of a blank subjected to an operation for forming a peripheral indentation according to a second method;

FIGS. 5 and 6 are views analogous to that according to FIG. 4 showing the production of an indentation according to a third and a fourth method;

FIG. 7 is an elevational view in section, of a second part of the ring according to FIG. 1;

DETAILED DESCRIPTION OF THE PREFERRED EMBODIMENTS

Figure 8:
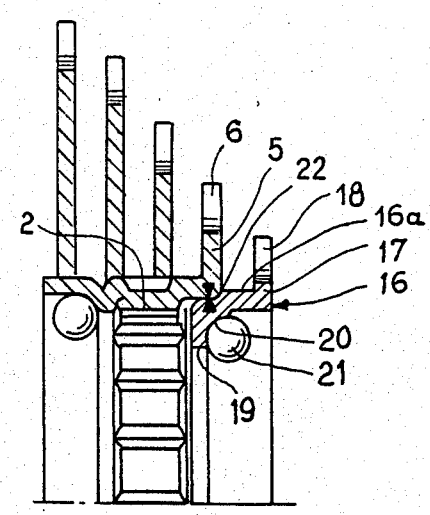
FIG. 8 is an elevational half-view, in section, of an alternative embodiment of the ring according to FIG. 1.

The sprocket support ring 1 shown in FIG. 1 is a sub-assembly created by assembling two ring members 2 and 3, produced separately either by stamping and subsequent trimming of a sheet metal disc or by the widening of a tube and its subsequent trimming. The first ring member 2 is produced from a blank shown in FIG. 2 which possesses a tubular portion 4 and an integrally produced collar 5 wherein is cut out a sprocket 6 which forms part of the group of sprockets for the free wheel to be produced. The collar 5 likewise serves as a brace for the ring member 2.

The first ring member 2 further possesses a circular indentation 7 produced in its tubular portion 4 by one of the methods shown diagrammatically in FIGS. 3 to 6.

According to the method shown in FIG. 3, the blank according to FIG. 1 is subjected to controlled buckling obtained by an axial thrust represented by the arrow P.

According to the method shown in FIG. 4, the circular indentation 7 is obtained by rolling the tubular part 4 of the blank between two or three serrated rollers m under the combined action of a rotation of the blank and the serrated rollers and a thrusting of the serrated rollers against the said blank.

According to the method in FIG. 5, the circular indentation 7 is produced by a flow turning operation of the blank placed on a forming mandrel M.

According to the method shown in FIG. 6, the circular indentation 7 is produced by magneto-forming of the blank placed, as in the case of FIG. 5, on a forming mandrel M. the zone of the tubular portion 4 of the blank in which the indentation 7 is to be formed being subjected to a magnetic field of a coil B energized by an alternating current source.

Numerous other methods make it possible to obtain the interior indentation required in the ring member 2. This indentation forms a ball race for a first row of balls 8 (FIG. 1), by means of which a free-wheel starwheel (not shown) is mounted in the ring.

It should be noted that the thickness e of the cylindrical wall of revolution 4 of the ring member 2 is slight and therefore does not permit the production of ratchets by the removal of metal, whether by cutting, slotting or broaching.

The ratchets 9 are thus produced by deformation of the cylindrical wall of revolution of thickness e, by a combined and simultaneous mechanical action of punching tools working in a radial manner towards the centre of the article, or by gradual circular generation involving shaping of reducing operations, with or without an interval supporting mandrel, or by magneto-forming with an internal supporting mandrel possessing an appropriate shape.

The operations described above make it possible to obtain, on the ring member 2, the circular indentation 7 and the ratchets 9 either starting with the circular indentation or starting with the ratchets, or simultaneously.

The second ring member 3 is produced from a blank similar to that used to produce the first ring member, but of suitable dimensions. The second ring member possesses a circular indentation 10 produced in the same manner as the circular indentation 3 of the first ring member 2 and forming a ball race for a second row of balls 11. Like the first ring member 2, the second ring member 3 possesses an integrally produced flange 12 in which is cut a sprocket 13, which is, in the present case, the smaller of the sprockets supported by the ring. The two ring members 2 and 3 are then assembled together by inserting the end of the second ring member 3 opposite the flange 12 into the end of the first ring member 2 bearing the collar 5, these two components being immobilized by bonding or welding, or by hooping the ring member 3 onto the ring member 2 by a mechanical or thermal action or by magneto-forming.

When the ratchets 9 are formed in the tubular part 4 of the first ring member 2, projections or teeth 14 appear on the external surface thereof by virtue of the deformation of the wall of slight thickness e of this tubular portion. These teeth, shown in FIG. 1A, act as means for centering some of the additional sprockets 15 intended to be mounted on the first ring member 2.

The fixing of the sprockets 15 on the ring member 2, facing the projections 14, will then be achieved for example by welding, soldering or bonding these sprockets onto the tops of a number of external projections 14 which are regularly distributed on the periphery of the ring member 2.

The additional sprockets 15, which face portions of the half-ring 2 which are devoid of teeth, can be fixed to the ring member by similar welding, bonding or soldering operations, either in discontinuous areas or in a continuous manner over the entire periphery of the ring.

In the alternative embodiment of the ring according to the invention shown in FIG. 8, the first ring member 2 is identical to the corresponding component in the ring according to FIG. 1. By contrast, the ring according to FIG. 8 possesses a second ring member 16 whose tubular portion 16a possesses, at its end opposite the collar 18 in which a sprocket 17 is cut out, a recessed flange 19 whose surface facing the bore of the ring member forms a ball race 20 for a row of balls 21.

Moreover, the external surface of the tubular part 16a possesses a shoulder 22 for positioning the second ring member 16 axially relative to the first ring member 2. The two ring members 2 and 16 are assembled together in the same manner as in the embodiment shown in FIG. 1.

Figure 9:
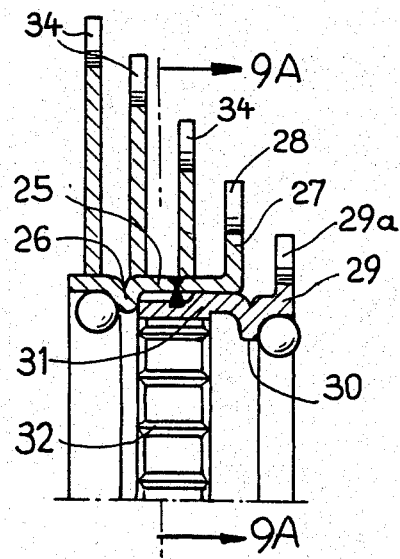
FIG. 9 is an elevational half-view, in section, of another embodiment of the ring according to the invention.
Figure 9A:
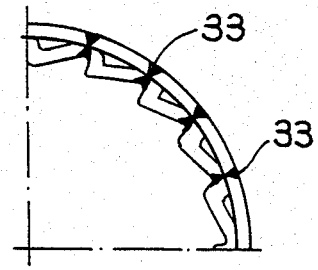
FIG. 9A is a section along the line 9A—9A in FIG. 9, showing the tubular portion of the ring.

FIG. 9 shows a free-wheel ring possessing a first ring member 25 possessing a circular interior indentation 26 analogous to the indentation 7 in the embodiment shown in FIG. 1. By contrast, the internal surface of the tubular portion of the ring member 25 located between the indentation 26 and its end bearing a collar 27, in which a sprocket 28 is cut, is smooth. A second ring member 29, provided with a collar in which, is cut a sprocket 29a is pressed in and fixed by welding, bonding or hooping into the first ring member 25. The second half-ring 29 possesses a circular interior indentation 30 forming a ball race for a second row of balls, and ratchets 32 are produced on the end of its flange 31 by one of the methods described with reference to FIG. 1. Projections 33 appear on the exterior of that zone of the second ring member in which the ratchets 32 are produced and ensure the centering of the ring member 29 in the ring member 25. These two ring members are assembled in the manner indicated above in the region of the projections 33 as shown in FIG. 9A. Finally, additional sprockets 34 intended to complete the free wheel are fixed by bonding or welding to the outer surface of the first ring member 25, which is free of roughness.

Figure 10:
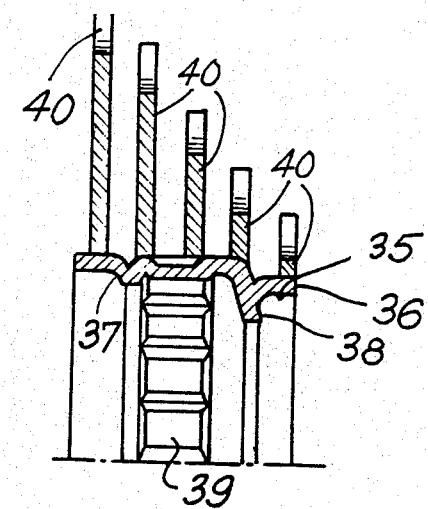
FIG. 10 is an elevational half-view in section, of a free-wheel ring produced in a single piece.

FIG. 10 shows a sprocket support ring 35 made in a single piece from a tube, at one of the ends of which a neck 36 is produced.

Two circular indentations 37, 38 forming ball races for corresponding rows of balls, and also ratchets 39, are then produced on the tube provided with the neck 36, by one of the methods described above.

According to this embodiment, all the free-wheel sprockets 40 are formed by separate units, which are fixed by welding, bonding or soldering to the ring thus produced.

Figure 11:
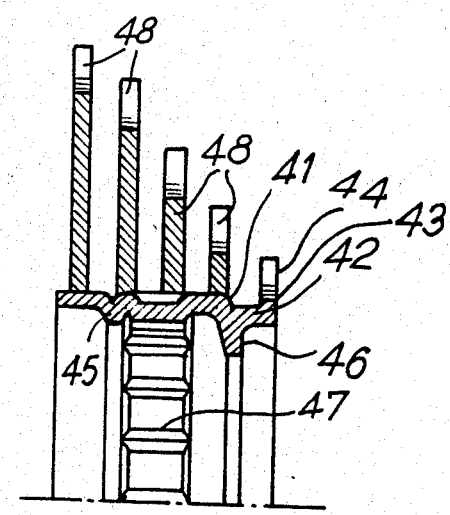
FIG. 11 is an elevational half-view, in section, of an alternative embodiment of the ring according to FIG. 10.

FIG. 11 shows a sprocket support ring 41 which is likewise produced from a tube on which a neck 42 and a collar 43 are formed. The collar is produced by widening the free end of the neck 42. A toothing 44 is cut out in the collar 43 to form the smaller sprocket of the free wheel.

Then, in the same manner as previously, circular indentations 45, 46 forming ball races, and ratchets 47, are created in the tube. The other sprockets 48 are mounted and fixed on the external surface of the ring in the manner described with reference to FIG. 10.

What is claimed is:

1. A multi-speed free-wheel sprocket support ring, including two axially spaced ball races for accommodating respective rows of balls connecting said ring to an interior starwheel, and ratchet teeth intended to interact with spring clicks supported by the starwheel, wherein said support ring is formed by at least one thin-walled tubular member of uniform wall thickness (2,3; 2,16; 25,29; 35; 41), and wherein said ball races (7,10; 7,20; 26,30; 37,38; 45,46) and said ratchet teeth (9; 32; 39; 47) are formed by deformations of the wall of said tubular member.

2. A ring according to claim 1, being formed by two ring members (2,3; 2,16; 25,29) fitted one into the other and fixed to one another by welding, bonding, soldering or hooping by mechanical or thermal action or magneto-forming.

3. A ring according to claim 2, wherein a first one of said ring members (2) has a circular indentation (7) forming a ball race for a first row of balls (8) formed by a deformation of the lateral wall of said first ring member together with ratchet teeth (9) likewise formed by deformations of the lateral wall of said first ring member (2).

4. A ring according to claim 3, wherein a second one of said ring members (16) has a shoulder (22) for positioning the second ring member relative to the first ring member (2), and a recessed flange (19) defining a ball race for a second row of balls (21).

5. A ring according to claim 4, wherein an outer surface of a part of the first ring member (2) in which the ratchet teeth (9) are made defines projections (14) having summits which serve to center and fix free-wheel sprockets (15) carried by said first ring member and facing said ratchet teeth (9).

6. A ring according to claim 2, wherein a first one of said ring members (25) has a circular indentation (7) forming a ball race for a first row of balls formed by a deformation of a lateral surface of the first ring member, and a second one of said ring members (29) has an indentation (30) forming a ball race for a second row of balls, and ratchet teeth (32) formed at an end (30) of said second ring member (29) engaged in said first ring member (25).

7. A ring according to claim 6, wherein said first and second ring members (2,3; 2,16; 25,29) each have an integrally produced end bracing collar (5,12; 5,17; 27,29) in which are cut teeth of a sprocket (6,13; 6,18; 28,29a) intended to form part of the free wheel to be produced.

8. A ring according to claim 6, wherein an outer surface of an end (31) of said second ring member (29) which is engaged in the first ring member (25) and in which the ratchet teeth (32) are formed, defines projections (33) for centering and fixing the second ring member in the first ring member.

9. A ring according to claim 2, wherein a second one of said ring members (3) has a circular indentation (10) forming a ball race for a second row of balls (11), formed by a deformation of the lateral surface of said second ring member.

10. A ring according to claim 1, wherein said ring is produced in a single thin tubular piece and defines a neck (36; 42), two circular indentations (37,38; 45,46) forming ball races for corresponding rows of balls, and ratchet teeth (39; 47) arranged between said circular indentations, the neck, the circular indentations and the ratchet teeth being formed by deformations of the lateral wall of said tubular piece.

11. A ring according to claim 10, wherein the tubular piece (42) has an end collar (43) in which teeth (44) of a free-wheel sprocket are cut.

* * * * *